(12) United States Patent
Peng et al.

(10) Patent No.: US 11,093,195 B2
(45) Date of Patent: Aug. 17, 2021

(54) METHOD, DEVICE AND COMPUTER PROGRAM PRODUCT FOR UPDATING USER INTERFACE

(71) Applicant: EMC IP Holding Company LLC, Hopkinton, MA (US)

(72) Inventors: Felix Peng, Chengdu (CN); Zhongyi Zhou, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/440,987

(22) Filed: Jun. 14, 2019

(65) Prior Publication Data

US 2020/0233624 A1 Jul. 23, 2020

(30) Foreign Application Priority Data

Jan. 17, 2019 (CN) .......................... 201910044707.5

(51) Int. Cl.
| | |
|---|---|
| *G09G 5/02* | (2006.01) |
| *G06F 3/14* | (2006.01) |
| *G06F 8/65* | (2018.01) |
| *G06F 8/61* | (2018.01) |
| *G10L 15/18* | (2013.01) |
| *G06F 8/38* | (2018.01) |
| *G06F 8/20* | (2018.01) |
| *G06F 3/041* | (2006.01) |

(52) U.S. Cl.
CPC .............. *G06F 3/14* (2013.01); *G06F 3/0416* (2013.01); *G06F 8/20* (2013.01); *G06F 8/38* (2013.01); *G06F 8/61* (2013.01); *G06F 8/65* (2013.01); *G10L 15/18* (2013.01)

(58) Field of Classification Search
USPC .......................................................... 345/594
See application file for complete search history.

(56) References Cited

U.S. PATENT DOCUMENTS

| | | | | |
|---|---|---|---|---|
| 2008/0165194 | A1* | 7/2008 | Uranaka | G06T 13/20 345/473 |
| 2012/0254143 | A1* | 10/2012 | Varma | G06F 40/30 707/706 |
| 2015/0379430 | A1* | 12/2015 | Dirac | G06N 20/00 706/12 |
| 2016/0358274 | A1* | 12/2016 | George | G06Q 10/10 |
| 2017/0039271 | A1* | 2/2017 | Bishop | G06F 40/211 |

* cited by examiner

*Primary Examiner* — Gordon G Liu
(74) *Attorney, Agent, or Firm* — Womble Bond Dickinson (US) LLP

(57) ABSTRACT

Embodiments of the present disclosure provide a method, device and computer program product for updating a user interface. According to example implementations of the present disclosure, an element sequence including a plurality of elements in the user interface is obtained, each element in the element sequence being associated with each of a plurality of actions being performed by a user in the user interface, the plurality of elements in the element sequence being sorted in an order of the plurality of actions being performed by the user; a natural language processing model is trained using the element sequence, the natural language processing model being used for modeling and feature-learning of a natural language; and the user interface is enabled to be updated based on the trained natural language processing model. Therefore, software developers can have deeper insight into users' needs and develop a more user-friendly user interface.

15 Claims, 6 Drawing Sheets

METHOD, DEVICE AND COMPUTER PROGRAM PRODUCT FOR UPDATING USER INTERFACE

CROSS-REFERENCE TO RELATED APPLICATION

This patent application claims priority, under 35 U.S.C. § 119, of Chinese Patent Application No. 201910044707.5, filed Jan. 17, 2019, entitled "METHOD, DEVICE AND COMPUTER PROGRAM PRODUCT FOR UPDATING USER INTERFACE," which is incorporated by reference in its entirety.

FIELD

Embodiments of the present disclosure generally relate to a user interface of an electronic device, and more specifically, to a method, device and computer program product for updating a user interface.

BACKGROUND

Data mining is the process of discovering patterns in large data sets. The user data mining helps discover the users' behavior patterns, learn the users' needs, and make intention prediction. The user data mining has enormous potential for applying in software development.

On one hand, the user data mining may help software developers learn how the users use software. At present, the software developers can acquire only basic information from the users. Such traditional information has very limited value to guide the software developers to learn more about the detailed users' behaviors and the relationship of software functions as understood by the users. Since different users may utilize different versions of the software, the value of the traditional information is further limited, causing the traditional information being unable to guide the software developers to develop the software satisfying the actual user needs.

On the other hand, the user data mining may help the users learn the software and how to use the software. Software products, in particular enterprise software (for example, Enterprise Copy Data Management (eCDM)), typically have a complicated mechanism, and the work flow thereof involves a lot of steps. Hence, the user guide of such software is too complicated to be user-friendly.

SUMMARY

Embodiments of the present disclosure provide a method, device and computer program product for updating a user interface.

In a first aspect of the present disclosure, there is provided a method of updating a user interface, comprising: obtaining an element sequence including a plurality of elements in the user interface, each element in the element sequence being associated with each of a plurality of actions being performed by a user in the user interface, the plurality of elements in the element sequence being sorted in an order of the plurality of actions being performed by the user; training a natural language processing model using the element sequence, the natural language processing model being used for modeling and feature-learning of a natural language; and enabling the user interface to be updated based on the trained natural language processing model.

In a second aspect of the present disclosure, there is provided a device for updating a user interface, comprising: at least one processing unit; and at least one memory coupled to the at least one processing unit and storing instructions to be executed by the at least one processing unit, the instructions, when executed by the at least one processing unit, causing the device to perform acts including: obtaining an element sequence including a plurality of elements in the user interface, each element in the element sequence being associated with each of a plurality of actions being performed by a user in the user interface, the plurality of elements in the element sequence being sorted in an order of the plurality of actions being performed by the user; training a natural language processing model using the element sequence, the natural language processing model being used for modeling and feature-learning of a natural language; and enabling the user interface to be updated based on the trained natural language processing model.

In a third aspect of the present disclosure, there is provided a computer program product. The computer program product is tangibly stored on a non-transient computer readable medium and comprises machine executable instructions which, when executed, cause a machine to implement the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments of the present disclosure with reference to the accompanying drawings, in which the same reference symbols generally refer to the same elements.

DETAILED DESCRIPTION OF EMBODIMENTS

Preferred embodiments of the present disclosure will now be described in detail with reference to the accompanying drawings. Although the drawings illustrate preferred embodiments of the present disclosure, it would be appreciated that the present disclosure may be implemented in various manners but should not be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

As described above, the software developers need a deep insight into the users' needs, in order to design a more user-friendly interface. Ease of operation is an important factor when users are selecting software products. If a software product cannot be operated easily, it often encounters with difficulties in wide promotion among users. Further, the current software developers typically predefine a fixed flow for users, and the users have to learn the new flow if the flow is updated.

The data collected with the current user data mining method have very limited value in helping the software developers understand the users' intention, and cannot be used for further analysis. Some software developers try to simplify software programs to make them easier to use, but it heavily depends on the scale and detailed mechanism of the software. Especially for the enterprise software, software simplification is a hard work.

Embodiments of the present disclosure provide a technical solution for updating a user interface. In the solution, it is proposed to collect "an action corpus" when a user is performing software operations, as will be described in detail below, and train a natural language processing model, using the action corpus, to capture "semantic relations" of user actions. In addition or alternatively, the trained natural language processing model may also be used to predict user intentions, so as to provide prompts for user operations.

Figure 1:
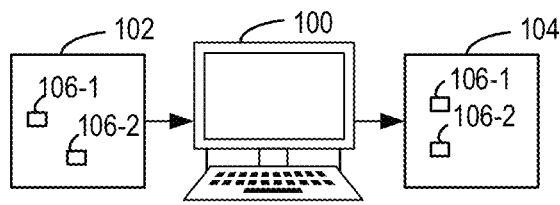
FIG. 1 illustrates a schematic diagram of a computing environment that can implement an embodiment of the present disclosure.

FIG. 1 illustrates a schematic diagram of a computing environment that can be used to implement an embodiment of the present disclosure. It would be appreciated that the structure and functionality of the computing environment, as shown in FIG. 1, are provided only as an example, rather than implying any limitation to the scope of the present disclosure. Embodiments of the present disclosure may be implemented in a different structure and/or architecture.

In the computing environment as shown in FIG. 1, the computing device 100 generates, based on a user interface 102 for input, an updated user interface 104. The user interface 102 and the updated user interface 104 include elements 106-1 and 106-2 (which are collectively referred to as "element 106"), respectively. Although only two elements are shown, it would be appreciated that the user interface may include more or fewer elements.

The element in the user interface herein may refer to: for example, a click button, a drop-down menu, an input box, a check box, and the like. The elements in the updated user interface 104 may be different than the elements in the user interface 102 in terms of position or structure, or may be fewer than the elements in the user interface 102.

In some embodiments, the computing device 100 may include an element sequence generating component and a training component. The element sequence generating component is provided for collecting element sequences associated with actions performed by users in the user interface 102, and these element sequences may form an action corpus. These element sequences may be from a software testing phase, for updating the interface before the software release. Alternatively or in addition, these element sequences may be collected from real users after the software release.

The training component trains a natural language model using these element sequences. The trained natural language model may generate feature vectors of the elements 106 for further understanding the user actions, and may predict and indicate a next operation potentially performed by users in the updated user interface 104 to improve ease of operation.

Figure 2:
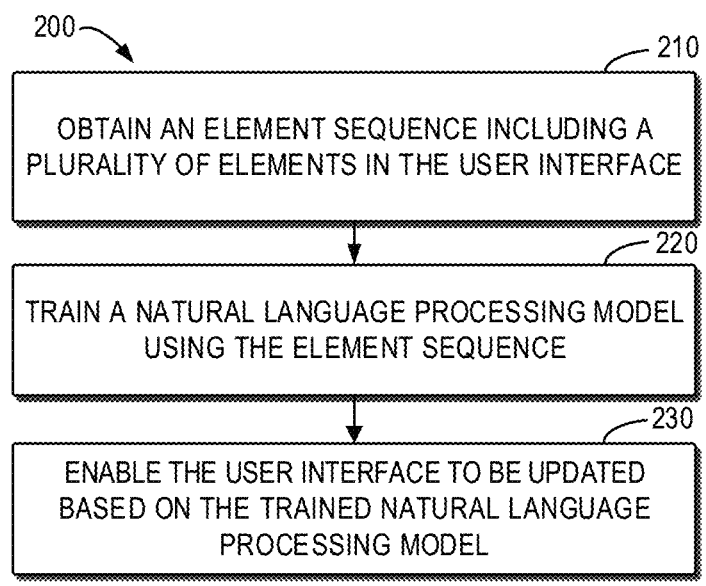
FIG. 2 illustrates a flowchart of a method of updating a user interface according to an embodiment of the present disclosure.

FIG. 2 illustrates a flowchart of a method 200 of updating a user interface according to an embodiment of the present disclosure. For example, the method 200 may be performed by the computing device 100 as shown in FIG. 1. The acts involved in the method 200 will be described with reference to FIG. 1. It would be appreciated that the method 200 may include additional acts not shown and/or skip the shown acts, and the scope of the present disclosure is not limited in the aspect.

In block 210, the computing device 100 obtains an element sequence including a plurality of elements 106 in the user interface 102, each element 106 in the element sequence is associated with each of a plurality of actions performed by a user in the user interface 102, and the plurality of elements 106 in the element sequence are sorted in an order of the plurality of actions being performed by the user.

In some embodiments, the computing device 100 obtains a plurality of actions performed by a user in the user interface 102, for example, by recording the actions performed by the user. Next, the computing device 100 determines a plurality of elements 106 associated with the plurality of actions, and each element 106 in the plurality of elements 106 is pre-assigned with an identifier. Then, the computing device 100 sorts the determined identifiers in an order of the plurality of actions being performed by the user. In the way, it is efficient to form the element sequence.

Figure 3:
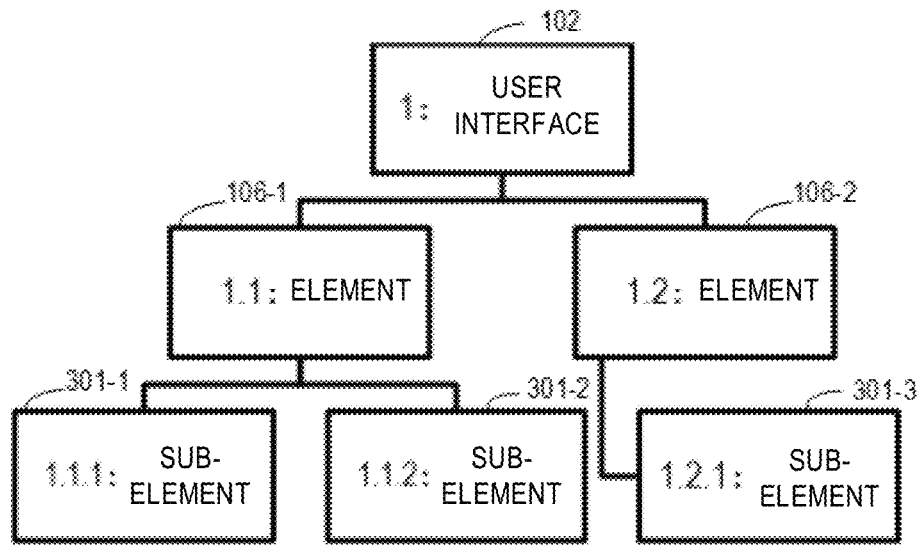
FIG. 3 illustrates a schematic diagram of a hierarchical structure of an example user interface according to an embodiment of the present disclosure.

The identifiers may be pre-assigned by the computing device 100 to the elements 106 in the user interface 102. A set of these identifiers and corresponding elements is referred to as an action dictionary. The user interface may include a graphical user interface and a command line user interface. FIG. 3 illustrates a schematic diagram of a hierarchical structure of an example user interface according to an embodiment of the present disclosure. The user interface 102 includes an element 106-1 and an element 106-2, the element 106-1 includes a sub-element 301-1 and a sub-element 302-2, and the element 106-2 includes a sub-element 301-3, where the sub-elements are collectively referred to as "sub-element 301." In the context, the sub-element 301 may represent a sub-menu of the element 106. It would be appreciated that, although limited numbers of elements and sub-elements are shown, the user interface may include more or fewer elements and sub-elements.

In order to create the action dictionary, the computing device 100 pre-assigns identifiers to the elements in the user interface, as shown in FIG. 3. The computing device 100 pre-assigns identifiers 1, 1.1, 1.2, 1.1.1, 1.1.2 and 1.2.1 to the user interface 102, the elements 106-1 and 106-2, and the sub-elements 301-1, 301-2 and 301-3, respectively. It would be appreciated that, although the identifiers are assigned according to the hierarchical structure of the user interface 102, other manners for assigning the identifiers are also feasible.

Figure 4:
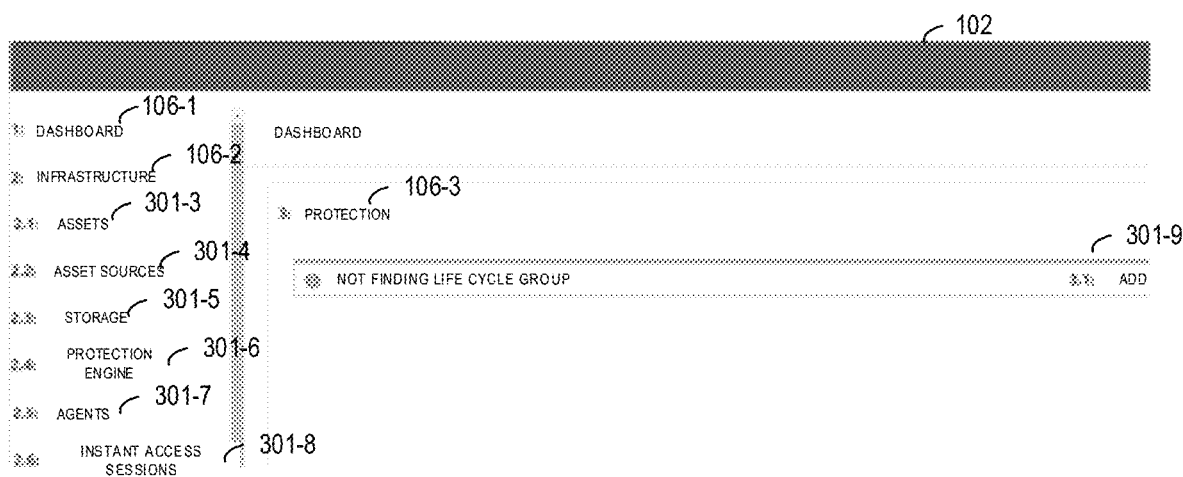
FIG. 4 illustrates a schematic diagram of a user interface including an element with an identifier according to an embodiment of the present disclosure.

FIG. 4 illustrates a schematic diagram of a user interface 102 including elements with identifiers according to an embodiment of the present disclosure. As shown, the user interface 102 includes the following elements: dashboard 106-1, infrastructure 106-2, and protection 106-3, which are assigned the identifiers: 1, 2 and 3. The user interface 102 also includes sub-elements of the infrastructure 106-2: assets 301-3, asset sources 301-4, storage 301-5, protection engines 301-6, agents 301-7, and instant access sessions 301-8, which are assigned identifiers 2.1-2.6, respectively. The user interface 102 further includes sub-elements of the protection 106-3: add 301-9, which is assigned an identifier 3.1.

Based in part on the element identifiers as shown in FIG. 4, the computing device 100 may form an action dictionary represented by the matrix (1). Likewise, the computing device 100 may form an action dictionary for the command line interface, which is represented by the matrix (2).

$$\begin{pmatrix} 0 & : & \text{login} \\ 0.1 & : & \text{user name} \\ 0.2 & : & \text{password} \\ 0.3 & : & \text{login button} \\ 1 & : & \text{Dashboard} \\ 1.1 & : & \text{Dashboard hide} \\ 2 & : & \text{Infrastructure} \\ 2.1 & : & \text{Assets} \\ 2.1.1 & : & \text{Protect button} \\ \vdots & \vdots & \vdots \\ 2.2 & : & \text{Asset sources} \\ 2.2.1 & : & \text{Add button} \\ 2.2.2 & : & \text{Assert checkbox} \\ \vdots & \vdots & \vdots \\ 2.5 & : & \text{Agents} \\ 2.5.1 & : & \text{Agents Checkbox} \\ 2.5.2 & : & \text{Accept Button} \\ \vdots & \vdots & \vdots \end{pmatrix} \quad (1)$$

$$\begin{pmatrix} 1 & : & \text{server check} \\ 1.1 & : & \text{parameter 1 for server check} \\ 1.2 & : & \text{parameter 2 for server check} \\ \vdots & \vdots & \vdots \\ 2 & : & \text{client check} \\ 2.1 & : & \text{parameter 1 for client check} \\ 2.2 & : & \text{parameter 2 for client check} \\ \vdots & \vdots & \vdots \end{pmatrix} \quad (2)$$

Using the generated action dictionary, the computing device 100 records the user's clicks on the graphical interface or command lines on the command line interface, to form the element sequence. For example, referring to FIG. 4 and the matrix (1), assumed that a user has to accept a register request from an agent, the user needs to log in and is navigated to an agent page for selecting the agent and clicking an accept button, and the element sequence associated with the series of actions is as follows: 0, 0.1, 0.2, 0.3, 2.5, 2.5.1, and 2.5.2.

In some embodiments, the computing device 100 may divide a plurality of element sequences in such a way that: an interval between the action associated with the last element in the element sequence and the action associated with the first element in the next element sequence exceeds a predetermined time threshold, for example, 5 minutes. It would be appreciated that 5 minutes herein is provided only as an example, without limitation, and the threshold time may be adjusted to be longer or shorter as required.

In other words, if a user does not perform a next action in 5 minutes after an action, the computing device 100 may mark the element sequence as complete, where the element associated with the action is located in the element sequence. In this way, the element sequences in the action corpus can be divided efficiently.

In some embodiments, the computing device 100 may obtain a user identifier associated with a plurality of actions, which is preset for the user performing the plurality of actions. The computing device 100 may obtain, based on the user identifier, the element sequences for the user. In this way, mutual influences among different users can be prevented efficiently, and element sequences dedicated to users thus can be generated.

For example, some software allows a plurality of users to simultaneously log in a server for operation. In this case, the computing device 100 may employ a session identifier associated with the user identifier to maintain respective contexts of the different users.

In some embodiments, when the computing device 100 pre-assigns identifiers to the elements 106 in the user interface 102, their static properties and dynamic properties should be taken into account. For example, for a graphical user interface, in a page of "agents" in FIG. 4, there may be a plurality of agent checkboxes. Given these agent checkboxes indicate the same action, the computing device 100 may assign the same element identifier to these agent checkboxes.

For another example, for a command line user interface, the computing device 100 may overlook some values of parameters of commands. For example, regarding the following command:
C:\Windows\System32>client check—address=xx.xxx.xxx.xxx
the computing device 100 records "—address" as an element associated with a user action and overlooks its specific value "xx.xxx.xxx.xxx".

Continuing to refer to FIG. 2, in block 220, the computing device 100 trains, using the element sequences, a natural language processing model which is provided for modeling and feature-learning of the natural language. In the following description, the word2vect algorithm acts as the natural language processing model for the description below, but it would be appreciated that other natural language processing models may be used.

Word2vec is a group of related models that are used to generate word embedding. These models are shallow neural networks, for example, including 1 input layer, 1 hidden layer and 1 output layer, which are trained to reconstruct contexts of words. Word2vec takes as its input a large amount of text and produces a vector space typically of several hundred dimensions, with each unique word in the corpus being assigned a corresponding vector in the space. Word vectors are in the vector space such that words that share common contexts in the corpus are located in close proximity to one another in the space.

Figure 5:
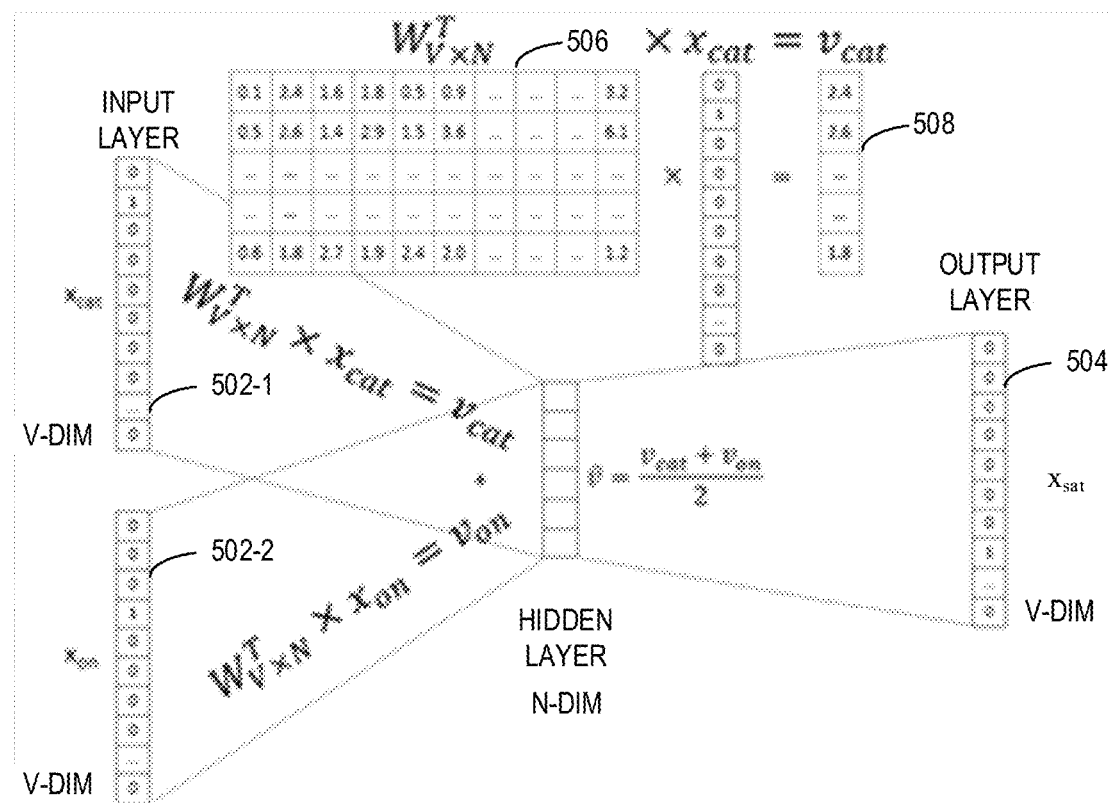
FIG. 5 illustrates a schematic diagram of training a natural language processing model.

For the traditional word2vec algorithm, there are 2 outputs: word vectors and a language model for predicting words and/or contexts. For example, FIG. 5 illustrates a schematic diagram of training word2vect using a sentence "the cat sat on the mat."

As shown, input vectors 502-1 and 502-2 (which are collectively referred to as "input vector 502") are V-dimensional vectors $x_{cat}$ and $x_{on}$ (for example, one hot representation) corresponding to "cat" and "on," and an output vector 504 is a V-dimensional vector $x_{sat}$ corresponding to "sat." $W_{V \times N}^T$ is the weight matrix 506 between the input layer and the hidden layer, which may map $x_{cat}$ and $x_{on}$ to N-dimensional word vectors $v_{cat}$ 508 and $v_{on}$ which are referred to as "feature vector" herein.

The word vector can capture similar semantic similarity according to different contexts in a specific corpus. For example, the word vector can capture a correspondence between the following words, for example, "man" and "woman," or "king" and "queen," or a correspondence between different tenses of words, for example, "walked" and "walking," or a correspondence of country-capital, or the like.

The model architecture of word2vec includes a Continuous Bag of Words (CBOW) and a skip-gram model, where the former uses the context to predict a word while the later uses a word to predict its context. In some embodiments, the skip-gram model is used preferably to predict the user's operation intention, because it is designed to obtain, using an element (i.e., a word) associated with the current user action, a predicting element (i.e., a context) associated with a predicting action. The below description will be provided with the skip-gram model as an example, but it would be appreciated that other model is feasible.

Figure 6:
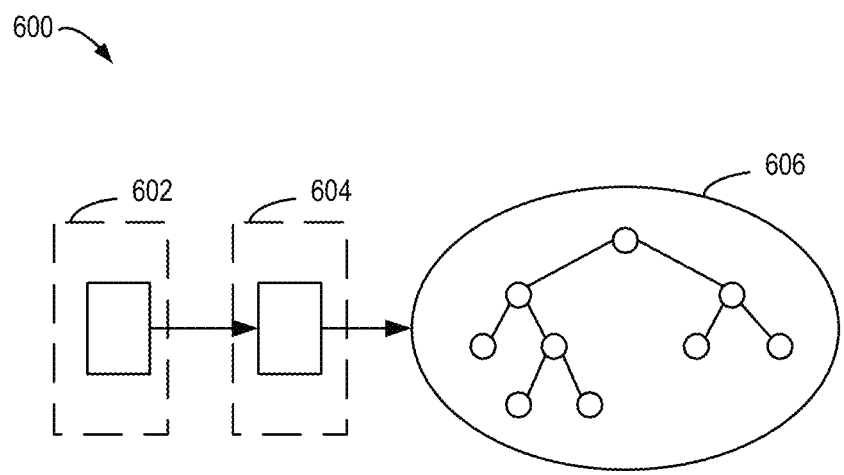
FIG. 6 illustrates a schematic diagram of a natural language processing model according to an embodiment of the present disclosure.

FIG. 6 illustrates a schematic diagram of a skip-gram model 600 according to an embodiment of the present disclosure. For the input layer 602, the feature vector of the element w is v(w), and an initial value of v(w) may be generated randomly, or may be one hot representation. The feature vector v(w) is directly copied to the hidden layer 604, and the hidden layer 604 therefore is not quite useful herein. The hidden layer 604 is more useful to the CBOW model, because it can be used to calculate a sum of feature vectors of a context.

In some embodiments, the output layer 606 may employ a Huffman tree, and the unique element in the element sequence corresponds to a leaf node of the tree. The general conception for creating a Huffman tree lies in that: as the element is closer to the root node, it is easier to find a more commonly used element.

Assume that the context of the element w is context(w), the objective function of the model is P(context(w)|w), which represents that given the element w, the probability of the occurrence of context(w). The training procedure is to predict, based on the element w, a context(w) by searching the Huffman tree. Therefore, for each internal node (any node that has a child node) in the Huffman tree, the model is actually binary classification. In the output layer, the skip-gram model utilizes the sigmoid function as an activation function:

$$\sigma(x_w^T \theta) = \frac{1}{1 + e^{-x_w^T \theta}} \quad (3)$$

where $\sigma(x_w^T \theta)$ is a probability that the result of the binary classification is true, and a probability that the result of binary classification is false is $1 - \sigma(x_w^T \theta)$, accordingly. $\theta$ represents vectors of internal nodes in the tree.

In the Huffman tree, an element u has a probability P(u|w) of being in the context of the element w, which is given below:

$$P(u \mid w) = \prod_{u \in context(w)} p(d_j^u \mid v(w), \theta_{j-1}^u) \quad (4)$$

$$P(context(w) \mid w) = \prod_{j=2}^{lw} P(u \mid w) \quad (5)$$

where j is an index of a starting node after the root node, lw is a path from the root node to a related leaf node, v(w) is a feature vector of w, and $d_j^u$ is Huffman code of the related node.

An objective function is a log likelihood function as below:

$$L = \sum_{w \in C} \log P(Context(w) \mid w) \quad (6)$$

In the training procedure, the computing device 100 updates the input feature vector v(w) and θ for an internal node in a plurality of iterations:

$$\theta = \theta + nG(\theta) \quad (7)$$

$$v(w) = v(w) + nG(w) \quad (8)$$

where G(θ) and G(w) are a gradient of θ and a gradient of w for the objective function L, respectively, and n is a learning rate which is a general parameter in neural network optimization. In the training procedure, the computing device 100 may employ the stochastic gradient descent algorithm to optimize the objective function.

In the embodiments of the present disclosure, the skip-gram model 600 may be implemented based on an open source library or framework, or may be implemented from zero via python or other programming languages.

Continuing to refer to FIG. 2, in block 230, the computing device 100 updates the user interface 102 based on the trained natural language processing model 600.

In some embodiments, the computing device 100 determines a plurality of feature vectors from the trained natural language processing model 600, each of the plurality of feature vectors corresponds to each element 106 in the plurality of elements 106 in the element sequence. As described above, the feature vector indicates the position of the element 106 in the semantic space. The computing device 100 determines, based on a plurality of feature vectors, relations between positions of a plurality of elements in a user interface and the plurality of elements. Therefore, the software developers may adjust the user interface from the users' perspective, for example, simplifying the overlapped interface layout. In addition or alternatively, the adjustment can be implemented automatically by the computing device 100.

A plurality of feature vectors, for example, may be input into an artificial intelligence algorithm, such as RNN, in an order of corresponding elements in the element sequence, to perform deeper analysis, such as "sentence parsing" or the like. Based on the feature vectors, the software developers may understand the semantic relations of elements in the user interface, so as to provide a user interface having a better logical structure. In addition, the computing device 100 can generate, based on feature vectors, a sequence vector to calculate a similarity of a user scenario. For example, the sequence vector can be calculated through the following equation:

$$\text{sequence vector} = \frac{\Sigma_1^M B_i}{M} \quad (9)$$

where M is a number of elements in the element sequence, and $B_i$ is a feature vector of an element in the element sequence.

In some embodiments, the computing device 100 obtains a current element associated with the current action performed by a user in a user interface; determines, based on the current element and the trained natural language processing model 600, a predicting element associated with a next action potentially performed by the user after the current action; and indicates the predicting element in the user interface. Therefore, operation of the user interface is much easier.

Figure 7:
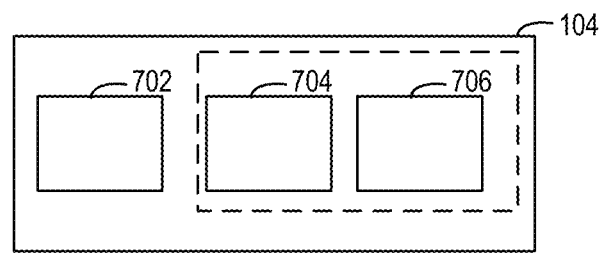
FIG. 7 illustrates a schematic diagram of an updated user interface according to an embodiment of the present disclosure.

FIG. 7 illustrates a schematic diagram of an updated user interface 104 according to an embodiment of the present disclosure. The user interface 104 includes an element 702 (for example, agents), an element 704 (for example, agent checkboxes), and an element 706 (for example, accept buttons). When detecting that a user clicks the element 702, the computing device 100 predicts, based on the trained natural language processing model 600, that the user most likely performs a next operation for the elements 704 and 706, and thus indicates the two elements to the user, for example, as shown with the dotted lines in FIG. 7. It would be appreciated that other indication manners are feasible.

Alternatively or in addition, in some embodiments, the software developers can collect element sequences of a plurality of users, to further learn the real user scenario and reduce subsequent user upgrade. Moreover, the software developers may get a picture of users' preferences on various functions.

As can be seen from the above description, the embodiments of the present disclosure can collect more meaningful user data and apply the natural language processing model to non-language related element sequences. The embodiments of the present disclosure can capture semantic relations between user actions, such that the software developers have an insight from the user perspective, and users can operate the software products more easily. Ideally, the users can operate software without referring to the complicated user guide. Through the technical solution of the present disclosure, the software developers can provide increasingly popular products to the users.

Figure 8:
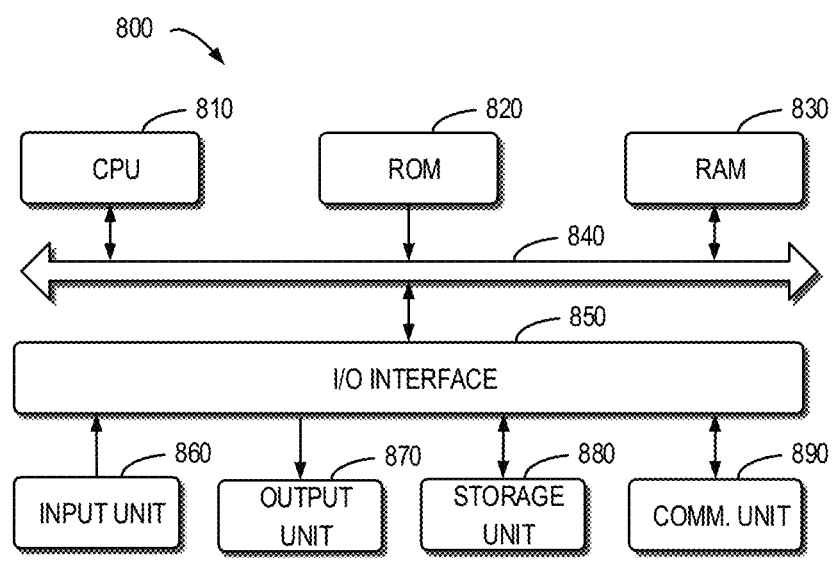
FIG. 8 illustrates a schematic diagram of an example device that can be used to implement an embodiment of the present disclosure.

FIG. 8 illustrates a block diagram of an example device 800 that can be used to implement an embodiment of the present disclosure. As shown, the device 800 includes a central processing unit (CPU) 810 which performs various appropriate acts and processing, based on a computer program instruction stored in a read-only memory (ROM) 820 or a computer program instruction loaded from a storage unit 880 to a random access memory (RAM) 830. The RAM 830 stores therein various programs and data required for operations of the device 800. The CPU 810, the ROM 820 and the RAM 830 are connected via a bus 840 with one another. An input/output (I/O) interface 850 is also connected to the bus 840.

The following components in the device 800 are connected to the I/O interface 850: an input unit 860 such as a keyboard, a mouse and the like; an output unit 870 including various kinds of displays and a loudspeaker, etc.; a storage unit 880 including a magnetic disk, and an optical disk, etc.; a communication unit 890 including a network card, a modem, and a wireless communication transceiver, etc. The communication unit 890 allows the device 800 to exchange information/data with other devices through a computer network such as the Internet and/or various kinds of telecommunications networks.

Various processes and processing described above, e.g., the method 200, may be performed by the processing unit 810. For example, in some embodiments, the method 200 may be implemented as a computer software program that is tangibly included in a machine readable medium, e.g., the storage unit 880. In some embodiments, part or all of the computer programs may be loaded and/or mounted onto the device 800 via ROM 820 and/or communication unit 890. When the computer program is loaded to the RAM 830 and executed by the CPU 810, one or more steps of the method 200 as described above may be performed.

The present disclosure may be a method, device, system, and/or computer program product. The computer program product may include a computer readable storage medium having computer readable program instructions thereon for carrying out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Jave, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of updating a user interface, comprising:
generating an action dictionary represented by a matrix based in part on an element identifier assigned to each of a plurality of elements in the user interface, the generated action dictionary comprising a set of a pair of the element identifier and a corresponding element of the plurality of elements in the user interface, wherein the element identifier is assigned according to a hierarchical structure of the user interface, wherein the user interface includes a plurality of elements, each of the plurality of elements include a plurality of sub-elements;
obtaining an element sequence including the plurality of elements in the user interface, each element in the element sequence being associated with each of a plurality of actions being performed by a user in the user interface, the plurality of elements in the element sequence being sorted in an order of the plurality of actions being performed by the user;
training a natural language processing model using the element sequence, the natural language processing model being used for modeling and feature-learning of a natural language, wherein the training is based on a Huffman tree and includes iteratively updating an input feature vector and a plurality of vectors of an internal node in the Huffman tree for the internal node;
determining a plurality of feature vectors from the trained natural language processing model, each of the plurality of feature vectors corresponding to each of the plurality of elements in the element sequence and indicating a position of each element in a semantic space; and
determining, based on the plurality of feature vectors, relations between the positions of the plurality of elements in the user interface and the plurality of elements; and
enabling the user interface to be updated based on the trained natural language processing model, wherein the plurality of elements in the updated user interface are different than the plurality of elements in the user interface in terms of position or structure.

2. The method of claim 1, wherein obtaining the element sequence comprises:

obtaining the plurality of actions being performed by the user in the user interface;

determining the plurality of elements associated with the plurality of actions;

determining an identifier pre-assigned to each of the plurality of elements; and sorting the determined identifiers in the order of the plurality of actions being performed by the user.

3. The method of claim 1, wherein an interval between an action associated with a last element in the element sequence and an action associated with a first element in a next element sequence exceeds a predetermined threshold time.

4. The method of claim 1, wherein obtaining the element sequence comprises:

obtaining a user identifier associated with the plurality of actions, the user identifier being preset for the user performing the plurality of actions; and obtaining, based on the user identifier, the element sequence for the user.

5. The method of claim 1, wherein updating the user interface comprises:

obtaining a current element associated with a current action being performed by the user in the user interface;

determining, based on the current element and the trained natural language processing model, a predicting element associated with an action to be potentially performed by the user after the current action; and indicating the predicting element in the user interface.

6. A device for updating a user interface, comprising:

at least one processing unit; and at least one memory coupled to the at least one processing unit and storing instructions to be executed by the at least one processing unit, the instructions, when executed by the at least one processing unit, causing the device to perform acts including:

generating an action dictionary represented by a matrix based in part on an element identifier assigned to each of a plurality of elements in the user interface, the generated action dictionary comprising a set of a pair of the element identifier and a corresponding element of the plurality of elements in the user interface, wherein the element identifier is assigned according to a hierarchical structure of the user interface, wherein the plurality of elements in the updated user interface are different than the plurality of elements in the user interface in terms of position or structure;

obtaining an element sequence including the plurality of elements in the user interface, each element in the element sequence being associated with each of a plurality of actions being performed by a user in the user interface, the plurality of elements in the element sequence being sorted in an order of the plurality of actions being performed by the user;

training a natural language processing model using the element sequence, the natural language processing model being used for modeling and feature-learning of a natural language, wherein the training is based on a Huffman tree and includes iteratively updating an input feature vector and a plurality of vectors of an internal node in the Huffman tree for the internal node;

determining a plurality of feature vectors from the trained natural language processing model, each of the plurality of feature vectors corresponding to each of the plurality of elements in the element sequence and indicating a position of each element in a semantic space; and determining, based on the plurality of feature vectors, relations between the positions of the plurality of elements in the user interface and the plurality of elements; and enabling the user interface to be updated based on the trained natural language processing model, wherein the plurality of elements in the updated user interface are different than the plurality of elements in the user interface in terms of position or structure.

7. The device of claim 6, wherein obtaining the element sequence comprises:

obtaining the plurality of actions being performed by the user in the user interface;

determining the plurality of elements associated with the plurality of actions;

determining an identifier pre-assigned to each of the plurality of elements; and sorting the determined identifiers in the order of the plurality of actions being performed by the user.

8. The device of claim 6, wherein an interval between an action associated with a last element in the element sequence and an action associated with a first element in a next element sequence exceeds a predetermined time threshold.

9. The device of claim 6, wherein obtaining the element sequence comprises:

obtaining a user identifier associated with the plurality of actions, the user identifier being preset for the user performing the plurality of actions; and obtaining, based on the user identifier, the element sequence for the user.

10. The device of claim 6, wherein updating the user interface comprises:

obtaining a current element associated with a current action being performed by the user in the user interface;

determining, based on the current element and the trained natural language processing model, a predicting element associated with an action to be potentially performed by the user after the current action; and indicating the predicting element in the user interface.

11. A computer program product, tangibly stored on a non-transient computer readable medium and comprising machine executable instructions which, when executed, cause a machine to perform operations, the operations comprising:

generating an action dictionary represented by a matrix based in part on an element identifier assigned to each of a plurality of elements in a user interface, the generated action dictionary comprising a set of a pair of the element identifier and a corresponding element of the plurality of elements in the user interface, wherein the element identifier is assigned according to a hierarchical structure of the user interface, wherein the plurality of elements in the updated user interface are different than the plurality of elements in the user interface in terms of position or structure;

obtaining an element sequence including the plurality of elements in the user interface, each element in the element sequence being associated with each of a plurality of actions being performed by a user in the user interface, the plurality of elements in the element sequence being sorted in an order of the plurality of actions being performed by the user;

training a natural language processing model using the element sequence, the natural language processing model being used for modeling and feature-learning of a natural language, wherein the training is based on a Huffman tree and includes iteratively updating an input feature vector and a plurality of vectors of an internal node in the Huffman tree for the internal node;

determining a plurality of feature vectors from the trained natural language processing model, each of the plurality of feature vectors corresponding to each of the plurality of elements in the element sequence and indicating a position of each element in a semantic space; and determining, based on the plurality of feature vectors, relations between the positions of the plurality of elements in the user interface and the plurality of elements; and enabling the user interface to be updated based on the trained natural language processing model, wherein the plurality of elements in the updated user interface are different than the plurality of elements in the user interface in terms of position or structure.

12. The computer program product of claim 11, wherein obtaining the element sequence comprises:

obtaining the plurality of actions being performed by the user in the user interface;

determining the plurality of elements associated with the plurality of actions;

determining an identifier pre-assigned to each of the plurality of elements; and sorting the determined identifiers in the order of the plurality of actions being performed by the user.

13. The computer program product of claim 11, wherein an interval between an action associated with a last element in the element sequence and an action associated with a first element in a next element sequence exceeds a predetermined threshold time.

14. The computer program product of claim 11, wherein obtaining the element sequence comprises:

obtaining a user identifier associated with the plurality of actions, the user identifier being preset for the user performing the plurality of actions; and obtaining, based on the user identifier, the element sequence for the user.

15. The computer program product of claim 11, wherein updating the user interface comprises:

obtaining a current element associated with a current action being performed by the user in the user interface;

determining, based on the current element and the trained natural language processing model, a predicting element associated with an action to be potentially performed by the user after the current action; and indicating the predicting element in the user interface.

* * * * *